Nov. 7, 1933.  W. A. BRANDT  1,933,785
CUT-OFF MECHANISM
Filed March 26, 1931  9 Sheets-Sheet 1

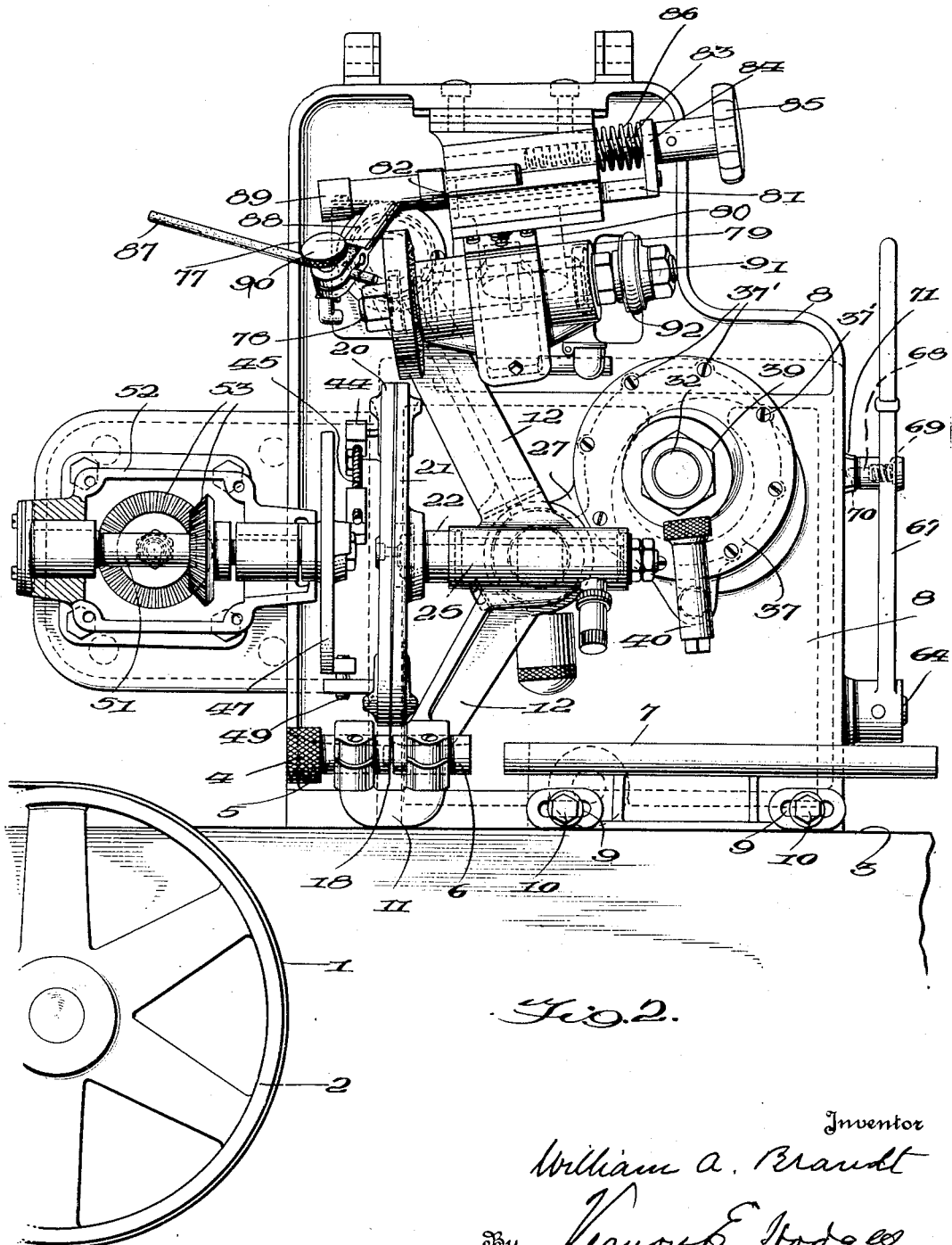

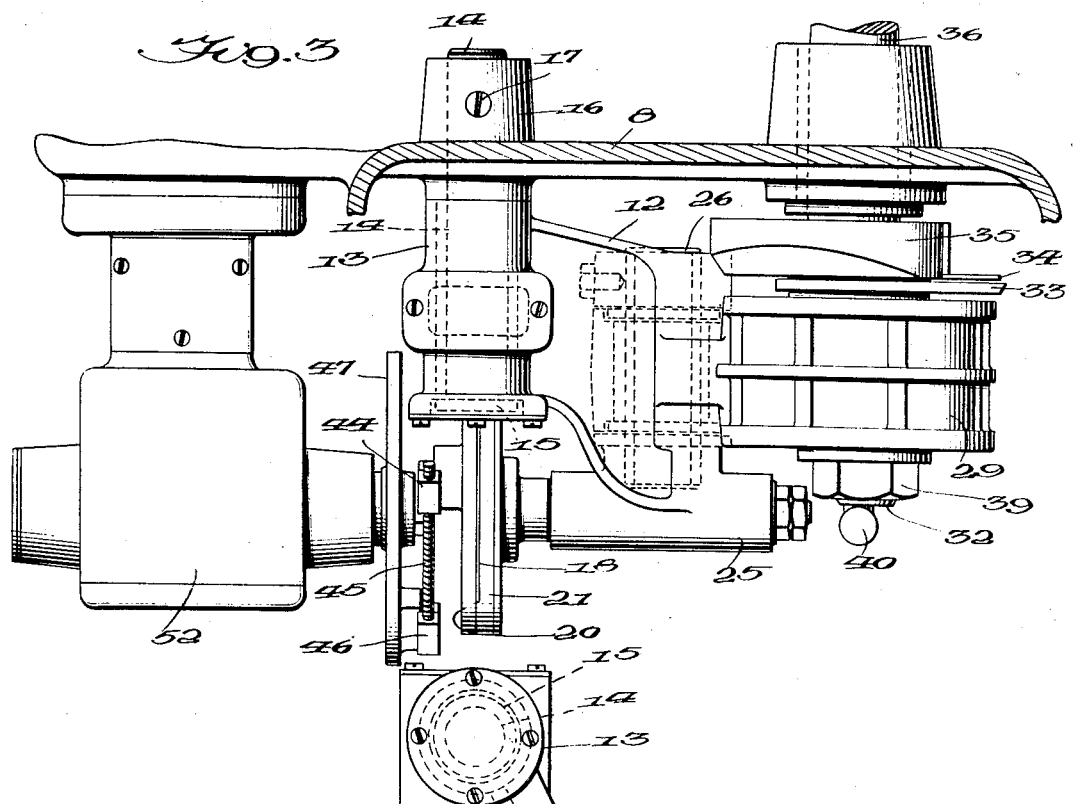

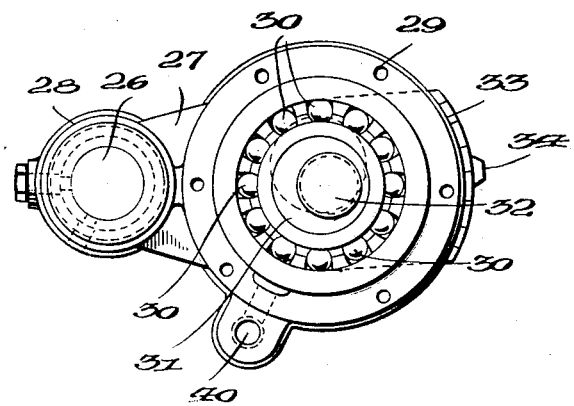
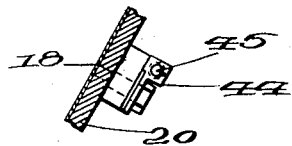
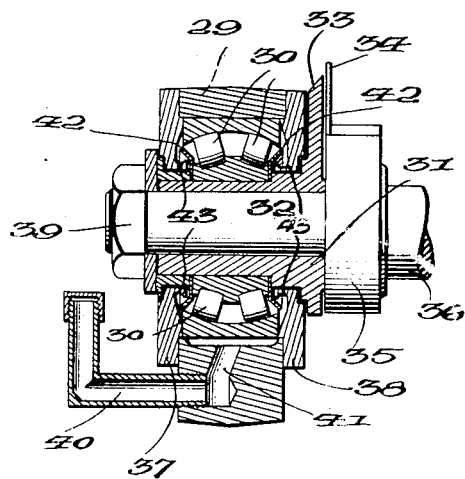
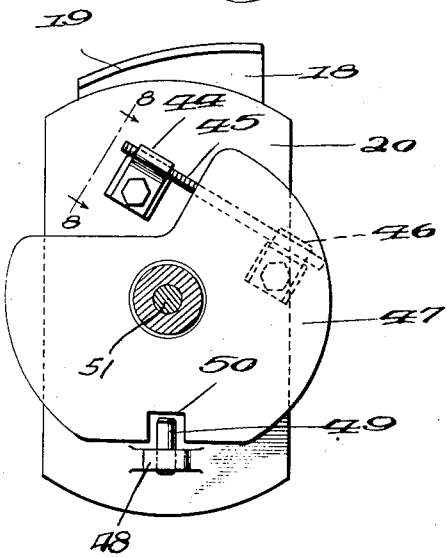

Patented Nov. 7, 1933

1,933,785

UNITED STATES PATENT OFFICE 1,933,785

CUT-OFF MECHANISM

William A. Brandt, Salem, Va., assignor to Comas Cigarette Machine Company, Salem, Va., a corporation of Virginia Application March 26, 1931. Serial No. 525,523

48 Claims. (Cl. 131—37)

This invention relates to an improvement in cut-off mechanism, particularly for use on cigarette machines where it is desired to cut a cigarette rod into predetermined lengths.

An object of the invention is to provide an effective mechanism capable of forming cigarettes by cutting the cigarette rod, and in which the cutting knife moves lengthwise with the cigarette rod during the cutting operation, so as to prevent buckling of the rod.

A further object of the invention is to provide for sharpening the knife and automatically keeping it sharp, and for this purpose a grinding wheel is used as supported on an axis arranged at an obtuse angle to the plane of the knife, so that the edge of the knife contacts with the grinding wheel when rotated, and the same pressure is applied on the cutting edge as the latter travels by the grinding wheel. It is possible to insert a straight piece of steel for the knife, preferably square on the edge, and by running the machine and the grinder, the knife will be formed and ground to the correct shape.

In the accompanying drawings:

Fig. 2 is a side elevation thereof;

Fig. 3 is a partial plan view of the spindle carrier structure;

Fig. 4 is a side elevation thereof partly in section;

Fig. 5 is a side elevation of the connecting rod structure for the spindle carrier with portions removed;

Fig. 6 is a sectional view therethrough taken on the line 6—6 of Fig. 4;

Fig. 7 is a sectional view showing the flexible couplet on the line 7—7 of Fig 4;

Fig. 8 is a detailed sectional view on the line 8—8 of Fig. 7;

Figure 1:
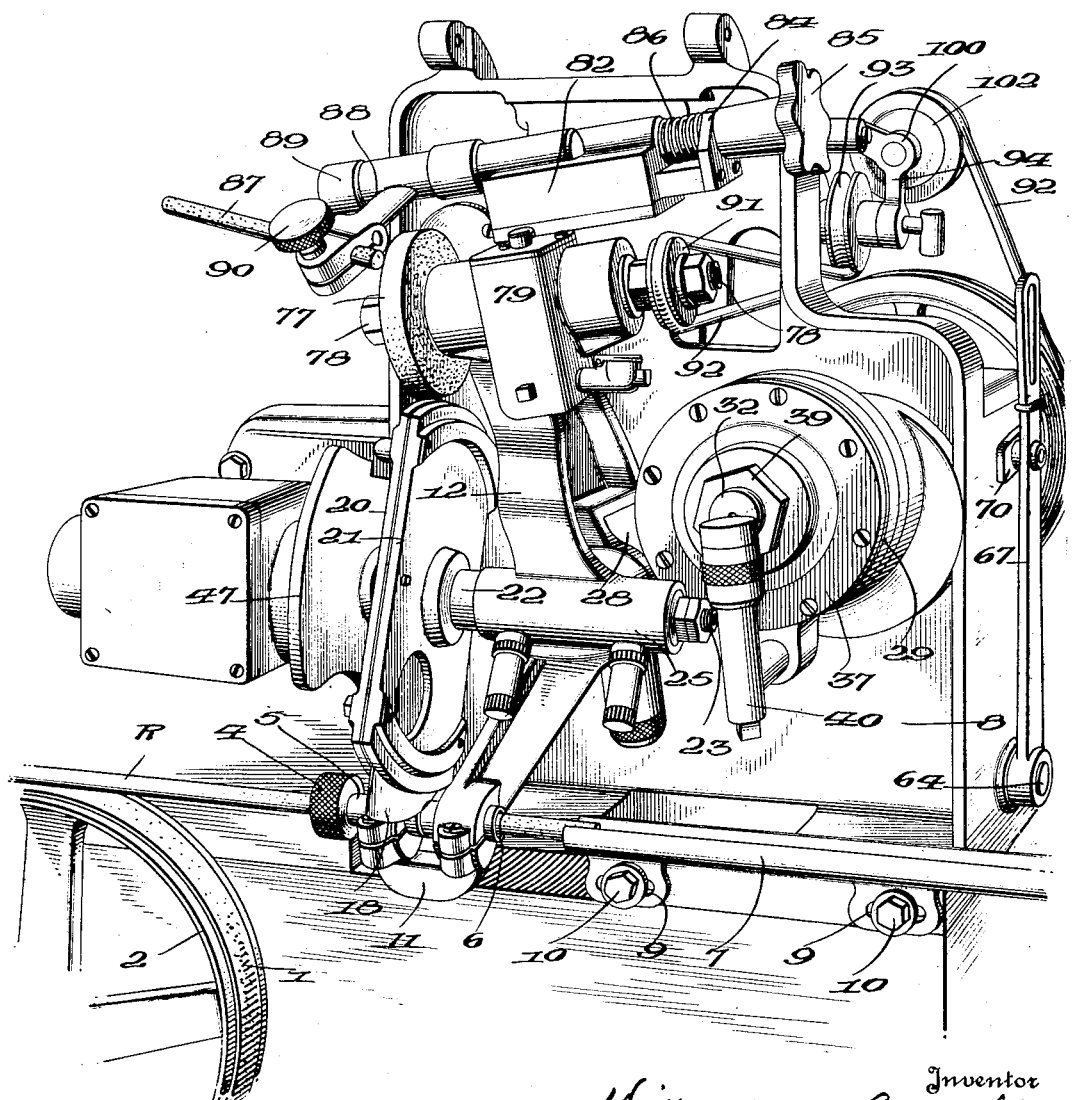
Fig. 1 is a perspective view of the complete cut-off machine.

This cut-off machine is designed for use in connection with a cigarette rod forming machine, which forms the cigarette rod and feeds the same to the cut-off machine for cutting the cigarette rod through at intervals in the formation of cigarettes therefrom.

The cigarette rod is designated R and is moved from the cigarette machine on a belt conveyor 1, which passes over pulleys 2, the belt conveyor being arranged slightly above the main frame or table 3, which may be a continuation of the corresponding structure in a cigarette machine. The cigarette rod R passes through a bell-shaped mouth 4 carried by a bushing 5 and through a second bushing 6 into a trough 7, which trough is carried by the casing structure 8 and is adjustable lengthwise thereof by slots 9 and set-screws 10, which pass through the slots and into the casing 8 to adjustably hold the trough 7 in position. Bushings 5 and 6 have tapered holes therethrough to provide free passage for the cigarette rod when the bushings swing to either extreme position.

A yoke 11 carries the bushings 5 and 6 slightly spaced apart to provide a ledger plate and is supported and fixed at the lower end of a spindle carrier 12. This spindle carrier 12, as shown particularly in Figs. 2, 3 and 4, extends upright and has a sleeve 13 formed at its upper end, through which a stub-shaft 14 extends and forms the pivot for the spindle carrier 12, the outer end of the stub-shaft 14 having a flanged head 15 thereon to fit against the inner edge of the sleeve 13 and hold the carrier 12 in place. The stub-shaft 14 is carried by a bearing 16 formed in the frame 8 and is held in place by a set-screw 17, which may be removed in order to permit the removal of the stub-shaft 14 and spindle carrier 12 whenever this may be desired.

The inner ends of the bushings 5 and 6 between the sides of the yoke 11 are slightly spaced apart, and this space is disposed in a position approximately in the same vertical plane as the axis of the stub-shaft 14, when the parts are in the intermediate position. The cutting knife 18 is adapted to operate through the space between the inner ends of the bushings 5 and 6 as a ledger plate in severing the cigarette rod R into lengths. As shown in Fig. 7, this knife 18 has its cutting edge 19 formed in generally spiral shape, the small end thereof being adapted to enter the cigarette rod first in order to form a shearing cut thereof. The knife 18 is supported in a clamped position between a plate 20 (see Fig. 4) and a flange 21 on a hub 22 carried by a spindle 23 mounted in bushings 24 within a cylinder 25 formed within the spindle carrier 12. This permits the knife 18 to rotate with the spindle 13 within the bushings 24 and cylinder 25. The knife 18 has only one cutting edge by which it makes a single cut for each revolution thereof.

The spindle carrier 12 supports a wrist-pin 26, which is shown with its axis in the same horizontal plane as the axis of the spindle 23 and at right angles thereto. A connecting rod 27 has a small head 28 journaled on the wrist-pin 26, and at its opposite end this connecting rod 27 has an enlarged head 29, the construction of which is shown more particularly in Figs. 5 and 6.

Disposed within the head 29 of the connecting rod is a roller bearing 30 located between the inner surface of the head 29 and the external surface of an eccentric bushing 31, which is in turn carried by a crank-pin 32. The eccentric bushing 31 serves to adjust the lengths of the cigarettes being cut by increasing or decreasing the throw of the crank-pin 32 and of the spindle carrier 12. This is accomplished by turning the eccentric bushing 31 relative to the crank-pin 32, and to permit of this turning movement, a graduated flange 33 is formed on the eccentric bushing 31 and is adapted to cooperate with a pointer 34 carried by a counterweight 35 formed on crank-shaft 36, which also carries the crank-pin 32.

Plates 37 and 38 close the opposite sides of the head 29 and are held in place by screws 37'. A nut 39 clamps the inner race of the roller bearings 30 to the eccentric bushing 31, while also clamping the eccentric bushing to the crank-pin 32.

An oil gauge or stem 40 is carried at one side of the head 29 and communicates with a duct 41 formed in a wall of the head 29 to maintain the proper oil level therein. Oil slingers 42 are provided within the head 29 and are clamped at the opposite ends of the inner roller bearing race to retain the oil about the bearings.

In this respect, the slingers 42 cooperate with grooves 43 formed within the plates 37 and 38. The oil slingers 42 retain the oil to such an extent that the parts are not heated up even though operated at a substantial speed, which may be 1,000 R. P. M. or more. The crank-pin 32 acts through connecting rod 27 to impart an oscillating motion to spindle carrier 12. The cigarette is cut off when the direction of travel of the spindle carrier 12 is the same as the direction of travel of the cigarette rod R, which occurs once for each revolution of the crank-shaft 36. The knife is caused to rotate at the same speed as the crank-shaft. The linear speed of the cigarette rod R is constant, regardless of what length of cigarette is cut off. When the graduated flange 33 is set for a 75 mm. cigarette, the crank-shaft rotates at 1,000 R. P. M. If the eccentric bushing 31 is set by the graduated flange 33 for a 60 mm. cigarette, the throw of the crank-pin 32 is reduced and the speed of the crank-shaft 36 is increased. For a 90 mm. cigarette, the crank throw is increased and the speed decreased. The increase and decrease in the speed of the crank-shaft may be effected by suitable change speed gears (not shown).

The knife 18 is driven by a flexible couplet, which causes rotation of the knife while allowing it to be oscillated by the spindle carrier 12. For this purpose, the plate 20 carries a lug 44, with which one end of a flexible shaft 45 is connected, the opposite end being clamped to a lug 46 on driving disk 47. A second lug 48 is also carried by the plate 20 and has an upstanding pin 49, which is disposed within a notch 50 formed in an edge of the driving disk 47 in order to cause simultaneous turning movement of the plate 20 with the driving disk 47, and thus prevent damage to the machine in case the flexible shaft 45 breaks.

Figure 9:
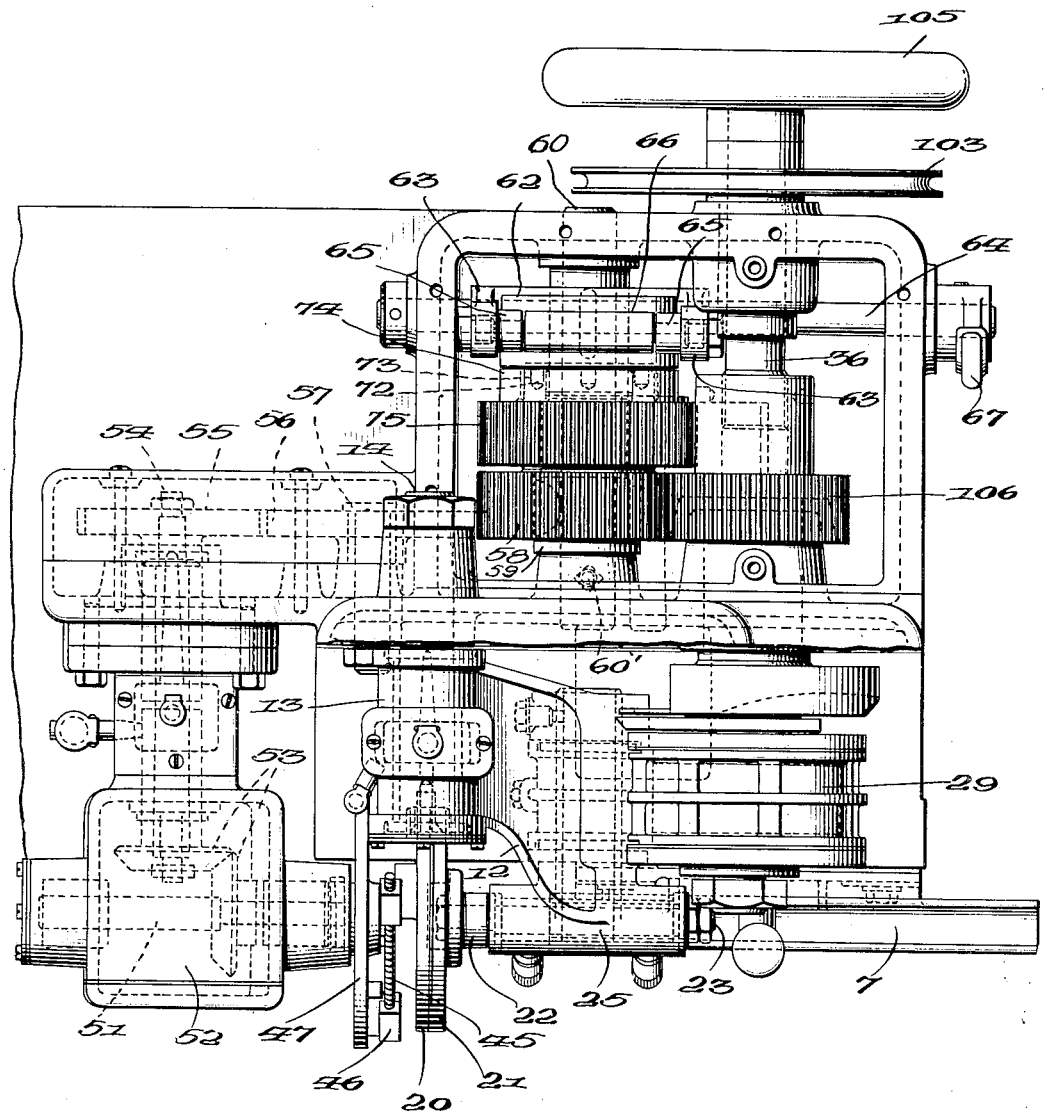
Fig. 9 is a top plan view of the complete machine, with parts broken away.

The driving disk 47 is fixed to the shaft 51 extending into a gear casing 52, wherein it is connected through bevel gears 53 with a shaft 54. The shaft 54 has a drive gear 55 keyed thereto, as shown in Fig. 9, and an idler gear 56 meshes with the gear 55 and is supported on a stud 57, which is in turn supported by the casing 8. The idler gear 56 also meshes with a gear 58 keyed to a sleeve 59 surrounding a stationary shaft 60 and carried thereby. Shaft 60 is held by a screw 60' shown in Figs. 9 and 10. This shaft 60 serves as a journal for the sleeve 59, which is operatively mounted thereon. A clutch disk 62 is keyed to the sleeve 59 and is longitudinally slidable thereon, by means of a yoke formed by arms 63, upstanding from a shaft 64 and carrying pins 65, which enter a groove 66 in the periphery of the clutch disk 62 in order to move the same lengthwise of the sleeve 59.

Figure 10:
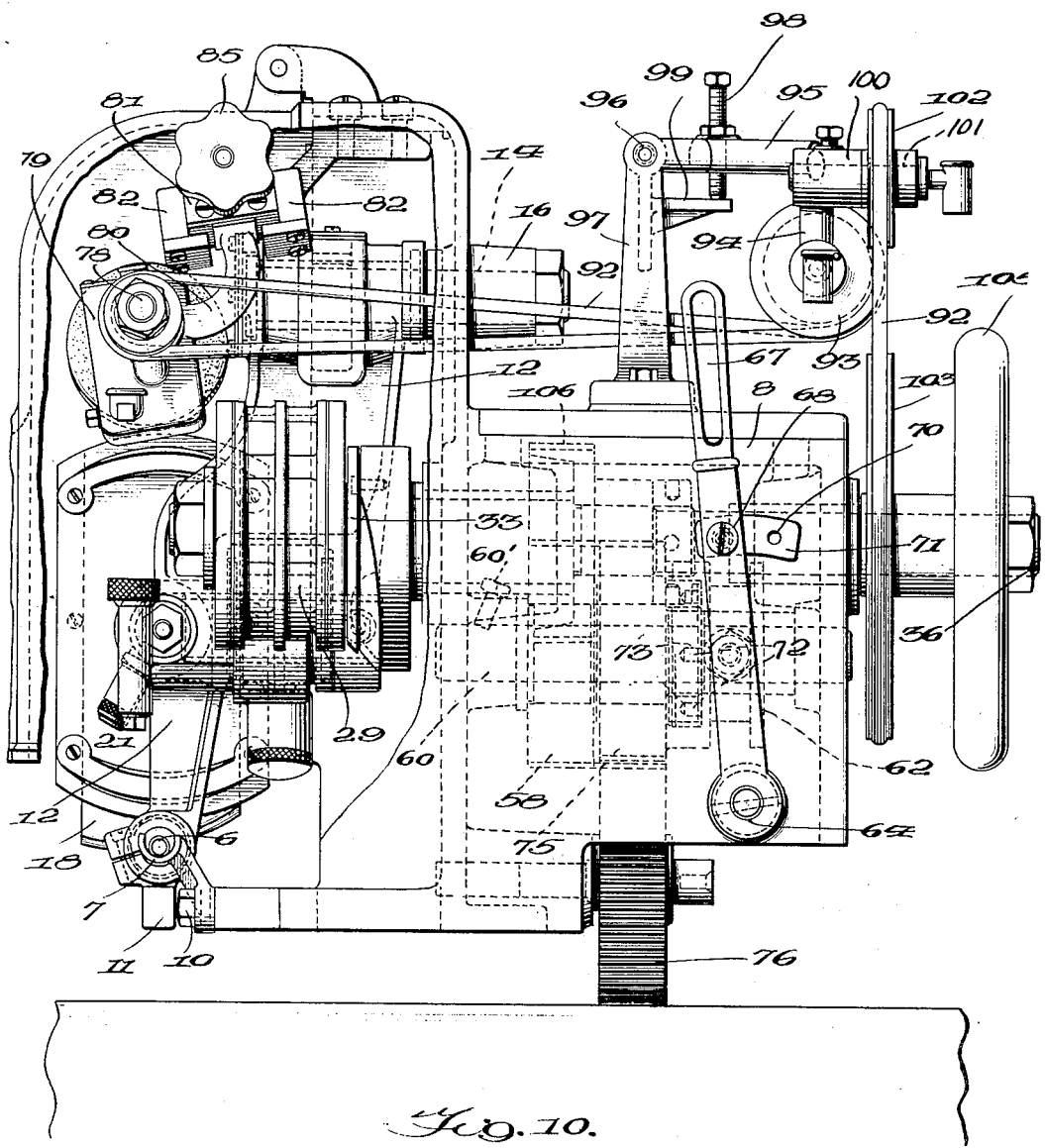
Fig. 10 is an end elevation thereof.

The shaft 64 is operated by a lever 67 fixed thereto, as shown in Figs. 2, 9 and 10. This lever 67 carries a pin 68 (see Fig. 2) normally pressed toward the casing 8 by means of a spring 69 acting thereon, and which pin 68 is adapted to enter openings 70 in a segment 71 formed on the end of the casing 8 to hold the lever 67 and the clutch disk 62 in a predetermined position.

The clutch disk 62 carries a plurality of pins 72 on the inner face thereof, which are adapted to enter openings 73 formed in the face of a flange 74 projecting outwardly from a gear 75 freely rotatable on the sleeve 59.

Figure 11:
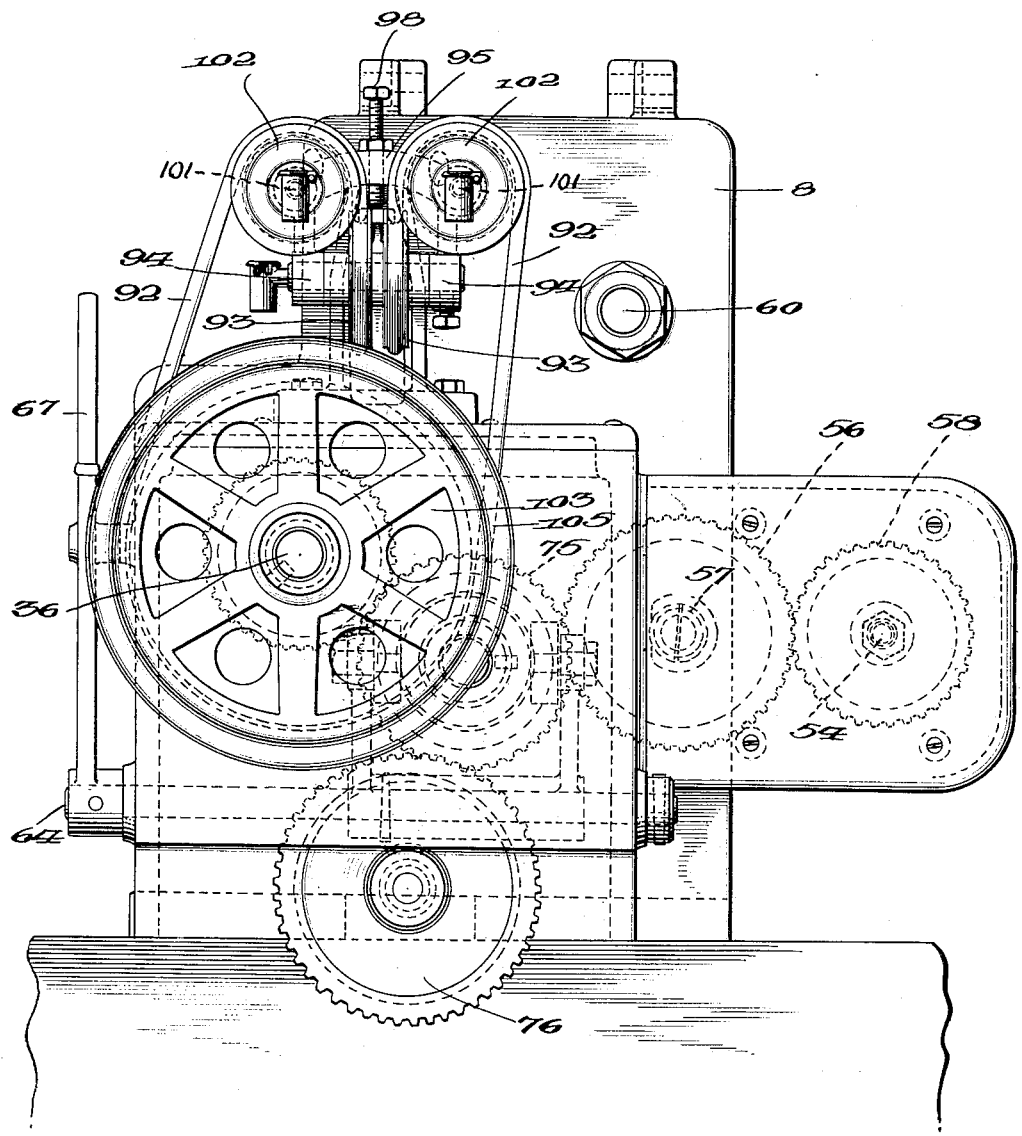
Fig. 11 is a rear elevation of the machine.

The gear 75 constitutes the main drive gear for the machine and is, in turn, driven by a train of gears, one of which is shown at 76 in Fig. 11, which train of gears are preferably driven from a main drive shaft which may be the draft shaft for the cigarette making machine.

Referring to Figs. 1 and 2, I have shown a grinding wheel 77 supported on a shaft 78 and mounted in a bearing 79, which bearing is in turn supported by an arm 80 extending downward from a slide 81 carried by a fixed guide 82 and adapted to be adjusted lengthwise thereof.

For this purpose, a screw 83 extends through a bracket 84 carried by the slide 81 and is screw-threaded into the fixed guide 82, the screw 83 being provided with a hand-wheel 85 for turning the same. A spring 86 is sleeved over the screw 83 and is interposed between the bracket 84 and the end of the fixed guide 82.

As shown in Fig. 2, the axis of the shaft 78 is arranged at an acute angle to the axis of the spindle 23 in intermediate position, so that when the knife is rotated to come into contact with the grinding wheel 77, the edge of the knife contacts with the grinding wheel and the same pressure is applied to the cutting edge of the knife throughout the travel of the latter, along the face of the grinding wheel.

In order to keep the grinding wheel 77 in proper condition, a dressing tool 87 is provided to be moved by hand across the surface of the grinding wheel 77. This dressing tool 87 is carried by an arm 88 extending laterally from a support 89, which is in turn carried by the fixed guide 82, as shown in Figs. 1 and 2. A thumb-screw 90 serves to hold the dressing tool in the arm 88 and to adjust the same against the surface of the grinding wheel 77.

The shaft 78 is provided with a pulley 91, about which a belt 92 extends and over parallel pulleys 93 at the rear of the machine, as shown in Figs. 10 and 11. The pulleys 93 are carried by downwardly extending arms 94 suspended from a bracket 95 pivotally as at 96 to a bracket 97 extending upward from the machine casing 8 at the rear thereof. The bracket 95 may be adjusted by means of a screw 98 which extends therethrough and engages a platform 99 extending rearwardly from the bracket 97. This adjustment of the bracket 95 permits of tightening the belt 92.

The pivoted bracket 95 carries bearings 100 located above the arms 94, and within which bearings 100 are mounted journals 101 for pulleys 102, about which the belt 92 extends after passing around edges of the pulleys 93, as is shown more clearly in Fig. 11. From the pulleys 102, the belt 92 extends about a drive pulley 103 on the shaft 36, which shaft 36 also carries a hand-wheel 105. The shaft 36 also carries a gear 106, within the casing 8, which gear 106 meshes with gear 58 and is driven therefrom so as to rotate the belt 92 and the grinding wheel 77 whenever the knife 18 is driven.

Operation

To repeat the operation of the machine as partly described above, the cigarette rod R is fed forward by the endless belt 1 from the cigarette rod making machine, and passes through the bell-shaped mouth 4 and the bushings 5 and 6, between which the knife 18 operates to cut the cigarette rod into predetermined lengths, depending upon the adjustment of the eccentric bushing 31 by the graduated flange 33 thereof. The operation of the knife is so timed that it cuts one cigarette for each revolution and the cigarettes, as cut, are pushed forward by the rod through the trough 7 from where they drop onto a belt conveyor or the like.

The spindle carrier 12, being pivoted on the stub shaft 14 and suspended therefrom, carries the knife 18 as well as the bushings 5 and 6, and by oscillating the spindle carrier 12, the knife is moved back and forth lengthwise of the cigarette rod R. This oscillation of the carrier 12 is caused by the connecting rod 27, which is pivotally connected therewith and is operated by the crank-pin 32, which has the eccentric bushing 31 disposed therearound to adjust the extent of movement of the connecting rod 27 and the spindle carrier 12, in order to vary the length of the cigarettes being cut by the knife 18.

The knife 18 is kept in a sharpened condition by being rotated against the face of the grinding wheel 77, which grinding wheel is rotated by the belt 92. The axis of the shaft 78 carrying the grinding wheel 77 is always disposed at an acute angle to the axis of rotation of the knife 18 in the form shown in Figs. 1, 2 and 10, so that the face of the grinding wheel will be disposed in proper position for grinding the cutting edge of the knife.

Figure 12:
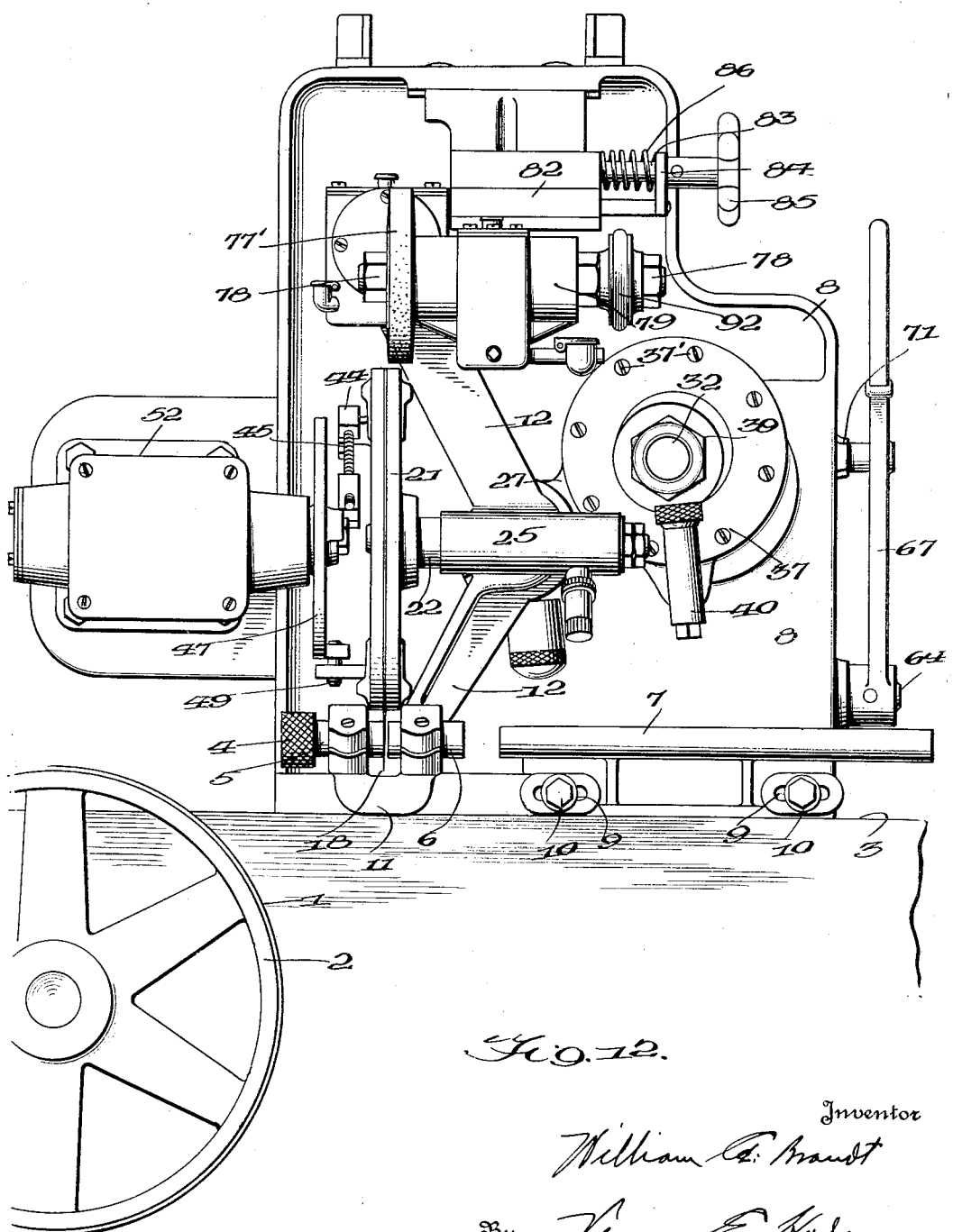
Fig. 12 is a front elevation of the machine with the grinding spindle rotatable about a horizontal axis.

In the form shown in Fig. 12, the grinding wheel shaft 78 has its axis arranged approximately horizontal instead of inclined to the horizontal as in Figs. 1 and 2, but the construction and operation of the parts is the same. The grinding wheel 77', however, has a beveled face, as shown in Fig. 12, in order to properly grind the edge of the knife 18.

Figures 13, 14:
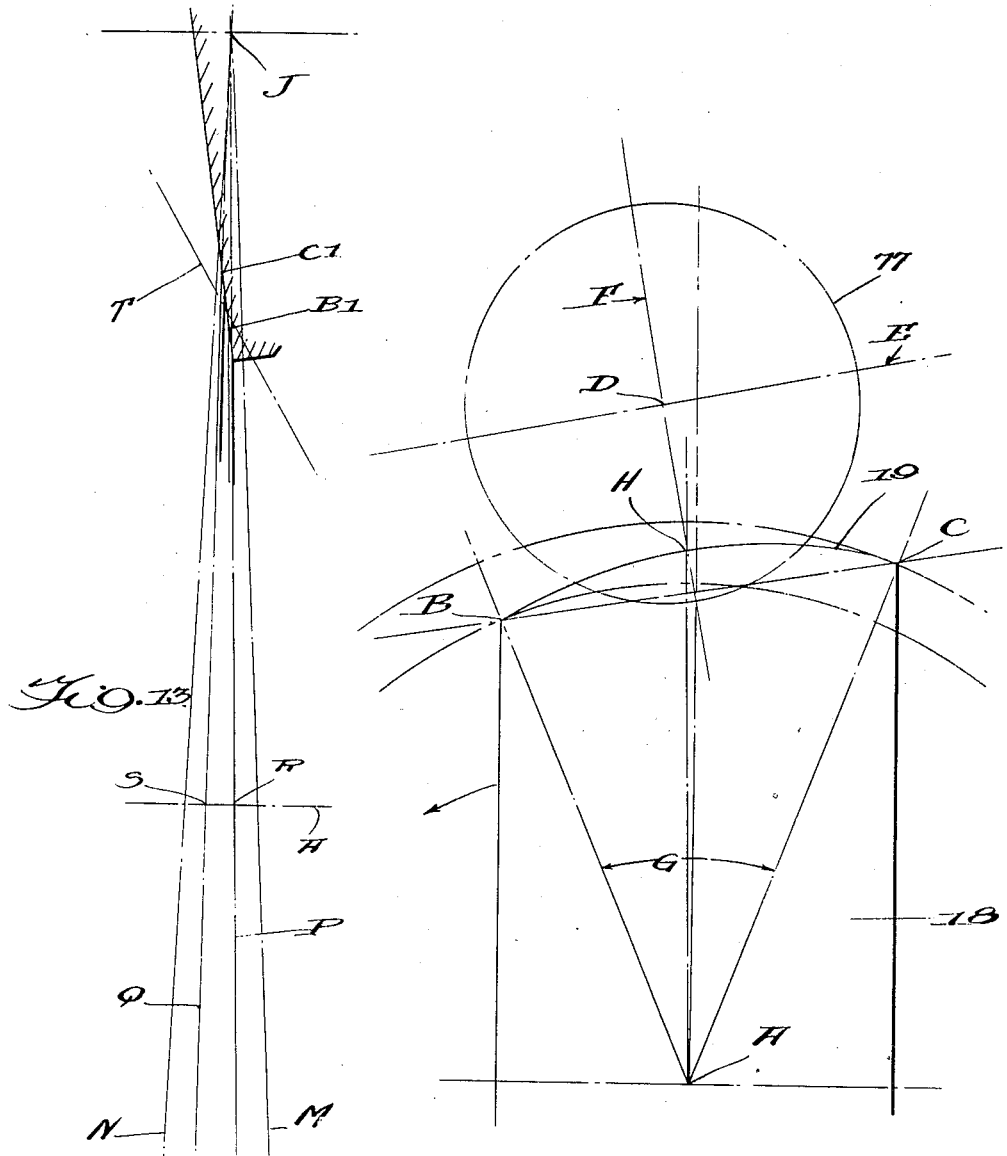
Fig. 13 is a diagrammatic view showing the location of the axes of the grinding wheel and knife.
Fig. 14 is a similar view at right angles thereto.

In the diagrammatic views shown in Figs. 13 and 14, there is illustrated the manner of producing a curved or spiral contour to the cutting edge 19 of the knife 18.

At A in Fig. 14 is represented the axis of the knife spindle 23. B represents the low point of the cutting edge of the knife, while C is the high point thereof. D represents the axis of the grinding wheel shaft 78, about which the grinding wheel 77 is rotated. The line E is parallel to the line —B, C— while line F is at right angles thereto and crosses line E at the axis D.

When the knife 18 is in the position shown in Fig. 14, it is contacting with the grinding wheel 77 or 77' along line F at a point H, which is approximately half-way between the points B and C, at which time the knife is approximately in the same vertical plane as the axis of the stub shaft 14, as shown in Fig. 2, and which is represented at J in Fig. 13, at which time the parts are in an intermediate position, that is, in a position approximately half-way between the two points B and C of the knife.

The angle G represents the angular travel of the knife from the time that the point B first contacts with the grinding wheel 77 along the line F until the point C leaves it. The extent of the total swing of the knife 18 is represented by lines M and N in Fig. 13, which knife swing is along the axis K of the cigarette rod, and is approximately equal to the diameter of the circle L, whose circumference is equal to the length of the cigarette to be cut off.

While the knife rotates through the angle G, the crank pin 32 rotates through the same angle and consequently the sides of an angle G1 in Fig. 13 equal to the angle G in Fig. 14 intersect the circle L at points O, and which points are projected onto the axis K at O1, and are connected from such points O1 with the axis J by lines P and Q. These lines represent the extent of the swing of the knife when it is revolving through the angle G in Fig. 14.

At B1 in Fig. 13 is shown the position of the knife at the beginning of the grinding action, while the position thereof at the end of such action is shown at C1. The distance from B1 to R is equal to the distance from C to A in Fig. 14.

Due to the swinging or oscillating motion of the knife, the amount of swing of the knife edge is very much less when it is being ground, that is, in its upper position, than when it is cutting through the cigarette in its lower position. This condition facilitates the grinding action. If the lines P and Q did not converge at the axis J but were parallel to each other, as would be the case if the knife had a reciprocating motion instead of an oscillating one, then the face of the grinding wheel would have to be tilted to a position indicated by the dotted line T in Fig. 13, which would not produce as thin nor as sharp an edge on the knife.

It will therefore appear that the advantageous grinding of the proper contour of the knife is produced by using a rotary grinding wheel, which is stationary in an axial direction, except for manual adjustment to compensate for wear and the dressing of the wheel and to keep it in contact with the knife, and which grinding wheel is mounted on an axis which is at an obtuse angle to the plane of the knife or is horizontal, in which event the grinding wheel would have an angular face.

Cooperating with such grinding wheel is a rotating and swinging knife edge, the extent of the swinging motion of which in a grinding position is considerably less than in a cutting position, thereby producing a thinner or sharper cutting edge.

I claim:

1. In a cut-off machine, the combination of a cutter having a spiral cutting edge, a pivotally supported arm for moving said cutter lengthwise of a cigarette rod, means for supporting the cutter for rotation about an axis fixed with respect to the arm and means for swinging said arm for moving the cutter lengthwise of the cigarette rod.

2. In a cut-off machine, the combination of a cutter having a spiral cutting edge, a pivoted arm for moving said cutter lengthwise of a cigarette rod, means for supporting the cutter for rotation about an axis fixed with respect to said arm, means for swinging said arm for moving the cutter lengthwise of the cigarette rod, and means for adjusting the extent of said swinging movement.

3. In a cut-off machine, the combination of a cutter, a pivoted arm supporting said cutter for rotation about an axis fixed with respect to the arm and for moving the cutter lengthwise of a cigarette rod, means for causing swinging movement of the arm about its pivot to move the cutter lengthwise of the cigarette rod, and means for adjusting the extent of said swinging movement.

4. In a cut-off machine, the combination of a spindle carrier, a pivotal support for said spindle carrier mounting said carrier for swinging movement, a spindle mounted in the carrier for rotation about an axis fixed with respect to the carrier and a cutter mounted on the spindle, the swinging movement of the carrier on the pivotal support causing movement of the cutter lengthwise of a cigarette rod.

5. In a cut-off machine, the combination of a spindle carrier, a pivotal support for said spindle carrier, a spindle mounted in the carrier for rotation about an axis fixed with respect to the carrier, a cutter mounted on the spindle for cutting a cigarette rod, and means for swinging the spindle carrier about its pivot for moving the cutter lengthwise of the cigarette rod.

6. In a cut-off machine, the combination of a spindle carrier, a pivotal support for said spindle carrier, a spindle mounted in the carrier for rotation about an axis fixed with respect to the carrier, a cutter mounted on the spindle for cutting a cigarette rod, means for swinging the spindle carrier about its pivot for moving the cutter lengthwise of the cigarette rod, and means for adjusting the extent of said swinging movement.

7. In a cut-off machine, the combination of a spindle carrier, a stub shaft on which said spindle carrier is pivotally supported, a spindle journaled in the spindle carrier, a knife support carried by the spindle and carrying a cutting knife, and means having a flexible connection directly with the support for rotating the same.

8. In a cut-off machine, the combination of a spindle carrier, a stub shaft on which said spindle carrier is pivotally supported, a spindle journaled in the spindle carrier, a knife carried by the spindle, means having a flexible connection with the knife for rotating the same, a connecting rod pivotally connected with the spindle carrier and oscillating the same longitudinally of a cigarette rod, and a crank connected with and for actuating the connecting rod to cause swinging movement of the spindle carrier.

9. In a cut-off machine, the combination of a spindle carrier, a stub shaft on which said spindle carrier is pivotally supported, a spindle journaled in the spindle carrier, a knife carried by the spindle, means having a flexible connection with the knife for rotating the same, a connecting rod pivotally connected with the spindle carrier, a crank connected with and for acuating the connecting rod to cause swinging movement of the spindle carrier, and eccentric bushing interposed between the crank and the connecting rod, and means for turning said bushing relative to the crank and connecting rod to vary the extent of the swinging movement of the spindle carrier.

10. In a cut-off machine, the combination of a cutter, a connecting rod for actuating said cutter, a crank pin for actuating the connecting rod, and means for varying the axis of the crank pin relative to the axis of the connecting rod bearing to vary the extent of movement of the cutter.

11. In a cut-off machine, the combination of a cutter adapted to move lengthwise of a cigarette rod, a connecting rod operatively connected with the cutter for causing said lengthwise movement thereof, a crank operatively connected with and for actuating the connecting rod, a bushing surrounding the crank eccentrically thereof and interposed between the crank and the connecting rod, and means for turning the bushing relative to the crank and connecting rod to adjust the extent of the longitudinal movement of the rod.

12. In a cut-off machine, the combination of a cutter adapted to move lengthwise of a cigarette rod and to cut the same, a connecting rod operatively connected with the cutter for moving the same lengthwise of the cigarette rod, said connecting rod having a cylindrical head, a drive shaft having a crank pin extending into the head, bearings mounted in the head between the crank pin and said head, plates closing the outer sides of the head, and a nut threaded onto the end of the crank pin for holding the parts together.

13. In a cut-off machine, the combination of a cutter adapted to move lengthwise of a cigarette rod and to cut the same, a connecting rod operatively connected with the cutter for moving the same lengthwise of the cigarette rod, said connecting rod having a cylindrical head, a drive shaft having a crank pin extending into the head, bearings mounted in the head between the crank pin and said head, plates closing the outer sides of the head, a nut threaded onto the end of the crank pin for holding the parts together, an eccentric bushing interposed between the crank pin and the bearings and having a peripheral flange thereon, and a pointer associated with the flange, said flange being adjustable to turn the eccentric bushing relative to the crank pin to vary the axis of the head relative to the axis of the crank pin and adjust the extent of movement of the cutter.

14. In a cut-off machine, the combination of a rotary cutting knife, a journal for said knife and disposed at one side thereof, a supporting element for the knife, a support for said journal for causing oscillating movement of the knife, and flexible driving means disposed on the opposite side of the knife from the journal for causing rotation of the knife.

15. In a cut-off machine, the combination of a rotary cutting knife, a pivotal support for said knife for causing oscillating movement thereof, means connected with one side of the knife for journaling the same within the pivotal support, and a flexible coupling connected with the opposite side of the knife for rotating the same.

16. A cut-off machine comprising a rotary knife, a clamp supporting the knife, a bracket connected with the clamp, a driving disk associated with the knife and having a bracket extending outwardly therefrom, a flexible shaft connecting said brackets together, and means for preventing relative rotation between the driving disk and clamp.

17. A cut-off machine comprising a knife, a clamp connected therewith and supporting the knife, a bracket extending laterally from the clamp, a driving disk associated with the knife in parallel relation and having a laterally extending bracket, a flexible shaft connecting said brackets together, means connecting the driving disk and clamp together to prevent relative rotation thereof, and driving means operatively connected with the driving disk.

18. In a cut-off machine, the combination with a rotary cutting knife, of a grinding wheel therefor, a shaft supporting said wheel, and arranged at an acute angle to the axis of rotation of the knife, a journal for said shaft, a slide supporting said journal, a spring acting on the slide and normally tending to move the same from the operating plane of the knife, an adjusting screw connected with said slide for adjusting the position thereof, and driving means for rotating the shaft.

19. In a cut-off machine, the combination of a cutter having a spiral cutting edge, means for rotating said cutter, and pivotal supporting means for the cutter causing oscillation only, thereof and longitudinally of a cigarette rod, said cutter being supported by said means for rotation about an axis normally fixed relative thereto.

20. In a cut-off machine, the combination of a cutter, means for rotating said cutter, means for moving the cutter in a curved path lengthwise of a cigarette rod, and a grinding wheel supported in a normally fixed position to be engaged by the cutter for sharpening said cutter.

21. In a cut-off machine, the combination of a cutter, means for rotating said cutter, pivotal supporting means for the cutter permitting oscillation thereof longitudinally of a cigarette rod, and a grinding wheel supported in a normally fixed position to be engaged by the cutter for sharpening the cutter.

22. In a cut-off machine, the combination of a cutter, a pivotally supported arm for moving said cutter lengthwise of a cigarette rod, means for swinging said arm for moving the cutter, and a grinding wheel supported in a normally fixed position to be engaged by the cutter for sharpening the same.

23. In a cut-off machine, the combination of a cutter having a spiral cutting edge, a pivotally supported arm for supporting the cutter for movement lengthwise of a cigarette rod, means for swinging said arm for moving the cutter, and a grinding wheel supported in a normally fixed position over the cutter to be engaged thereby only when turned in a general direction toward the pivotal point of the arm.

24. In a cut-off machine, the combination of a cutter having a spiral cutting edge, means for rotating the cutter, an arm for supporting the cutter for movement lengthwise of a cigarette rod, a pivotal support for said arm, means for swinging the arm on said pivotal support, and a grinding wheel supported in a normally fixed position approximately between the cutter and the pivotal support to be engaged thereby only when the cutter is turned in a general direction toward the pivotal support.

25. In a cut-off machine, the combination of a cutter, means for rotating the cutter, an arm for supporting the cutter for movement lengthwise of a cigarette rod, a pivotal support for said arm, means for swinging the arm on said pivotal support, a grinding wheel supported in a normally fixed position approximately between the cutter and the pivotal support to be engaged thereby only when the cutter is turned in a general direction toward the pivotal support, means for rotating the grinding wheel, and means for adjusting the position of the grinding wheel relative to the cutter.

26. In a cut-off machine, the combination of a cutter carrier, a support for the carrier for causing only a movement thereof in a curved path lengthwise of a cigarette rod, means for actuating said carrier, and a cutter carried by the support and having its axis fixed with respect to the support and constructed and arranged for cutting the cigarette rod on movement of the cutter in one direction.

27. In a cut-off machine, the combination of a cutter carrier, a support for the carrier for causing only a movement thereof in a curved path in a plane lengthwise of a cigarette rod, means for actuating said carrier, and a cutter carried by the support in a fixed relation thereto and constructed and arranged for cutting the cigarette rod on movement of the cutter in one direction.

28. In a cut-off machine, the combination of a cutter carrier, a pivotal support for the carrier constructed and arranged for causing movement thereof in a single plane only lengthwise of a cigarette rod, means for actuating said carrier, and a cutter carried by the support in a fixed relation thereto and arranged for cutting the cigarette rod on movement of the cutter in one direction.

29. In a cut-off machine, the combination of a rotary cutting knife, a supporting element for the knife, a journal carrying said supporting element, and means having a flexible connection directly with the supporting element for rotating the knife.

30. In a cut-off machine, the combination of a rotary cutting knife, a supporting element for the knife, a journal carrying said supporting element, a support for the journal for causing back and forth movement of the knife, and means having a flexible connection directly with the supporting element for rotating the knife.

31. In a cut-off machine, the combination of a cutter, a connecting rod for moving the cutter, a crank having a crank pin for actuating the connecting rod, said connecting rod being journaled on the crank pin, and means for adjusting the axis of said journal relative to the axis of the crank pin.

32. In a cut-off machine, the combination of a cutter, a connecting rod for moving the cutter, a crank shaft having a crank pin fixed thereto, said connecting rod being journaled on the crank pin, and means for adjusting the axis of said journal relative to the axis of the crank pin for varying the extent of movement of the cutter.

33. In a continuous rod cigarette machine, the combination with a movable frame, of a revolving cutoff blade and cooperating ledger plate carried by said frame, the ledger plate being secured on the frame in fixed relation to the center of rotation of the blade, and means for moving said frame to cause said blade and ledger plate to operate on and simultaneously follow the cigarette rod.

34. In a cut-off machine, the combination of a cutter, a support therefor constructed and arranged for causing swinging movement of the cutter longitudinally of a cigarette rod, and means for mounting the cutter on the support for rotation about an axis fixed with respect to the support.

35. In a cut-off machine, the combination of a cutter, a support therefor constructed and arranged for causing swinging movement of the cutter longitudinally of a cigarette rod, and means for rotatably mounting the cutter on the support, said means having the axis of rotation normally fixed with respect to the support.

36. In a cut-off machine, the combination of a cutter, a pivoted support therefor constructed and arranged for causing swinging movement of the cutter longitudinally of a cigarette rod, means for rotatably mounting the cutter on the support, said means having the axis of rotation normally fixed with respect to the support, and means for actuating the support.

37. In a cut-off machine, the combination of a rotary cutting knife, a journal arranged at one side of and carrying the knife, and means having a flexible connection with the opposite side of the knife for rotating the same.

38. In a cut-off machine, the combination of a rotary cutting knife, a support therefor, a journal carrying said support and arranged at one side of the knife, and means having a flexible driving connection with the support at the opposite side of the knife from said journal.

39. In a continuous rod cigarette machine, the combination of a movable frame, a ledger plate carried by the frame, a spindle supported by the frame, a revolving cut-off blade carried by the spindle, said ledger plate being secured to the frame in fixed relation to the center of rotation of the blade, and means for moving the frame to cause said blade and ledger plate to operate on and simultaneously follow a cigarette rod.

40. In a continuous rod cigarette machine, the combination of a movable frame, a ledger plate carried by the frame, a spindle wholly supported by the frame, a revolving cut-off blade carried by the spindle, said ledger plate and spindle being secured to the frame in fixed relation to each other, and means for moving the frame to cause said blade and ledger plate to operate on and simultaneously follow a cigarette rod.

41. In a continuous rod cigarette machine, the combination of a swinging frame, a ledger plate carried by the frame, a spindle carried by the frame, a revolving cut-off blade carried by the spindle, said ledger plate and spindle being secured to the frame in fixed relation to each other, and means for causing swinging movement of the frame to cause said blade and ledger plate to operate on and simultaneously follow a cigarette rod.

42. In a cut-off machine, the combination of a swinging frame movable in an orbit, a revolving cut-off blade and cooperating ledger plate carried by the frame, the ledger plate and cut-off blade being mounted in fixed relation to each other, and means for causing swinging movement of the frame to cause said blade and ledger plate to operate on and simultaneously follow a cigarette rod.

43. In a cut-off machine, the combination of a cutter, supporting means for the cutter and constructed and arranged for movement of the cutter in a curved path lengthwise of a cigarette rod, said cutter being supported by said means for rotation about an axis normally fixed relative thereto.

44. In a cut-off machine, the combination of a cutter, a supporting frame for the cutter and constructed and arranged for movement of the cutter in a curved path lengthwise of a cigarette rod, said cutter being supported by the frame for rotation about an axis fixed relative thereto, and actuating means for the cutter and frame.

45. In a cut-off machine, the combination of a cutter having a spiral cutting edge, a supporting frame for the cutter and constructed and arranged for swinging the cutter in a curved path lengthwise of a cigarette rod, said cutter being carried by the frame for rotation about an axis fixed relative thereto, means for causing swinging movement of the frame, and actuating means for the cutter.

46. In a cut-off machine, the combination of a rotary cutting knife, a journal for said knife, means mounted on the journal and carrying the knife, a flexible shaft having an end connected with said knife carrying means, and driving means connected with the opposite end of said flexible shaft.

47. In a cut-off machine, the combination of a rotary cutting knife, a journal therefor, means mounted on the journal and carrying the knife, a flexible shaft having an end connected with said knife carrying means, a driving disk connected with the opposite end of said flexible shaft, means for preventing relative rotation between the driving disk and knife, and means for causing movement of the knife lengthwise of a cigarette rod.

48. In a cut-off machine, the combination of a cutter having a spiral cutting edge, means for rotating said cutter, supporting means for the cutter for causing movement thereof in an arc, and a grinding tool disposed approximately at the center of said arc in position to be engaged by the cutter for sharpening said cutter.

WILLIAM A. BRANDT.